(12) United States Patent
Hanebutte (10) Patent No.: US 10,417,531 B2
(45) Date of Patent: Sep. 17, 2019

(54) TECHNIQUES FOR ENCAPSULATING METADATA IN CONTEXTUAL DATA STREAMS

(71) Applicant: INTEL CORPORATION, Santa Clara, CA (US)

(72) Inventor: Ulf R. Hanebutte, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 13/720,015

(22) Filed: Dec. 19, 2012

(65) Prior Publication Data

US 2014/0172366 A1 Jun. 19, 2014

(51) Int. Cl.
*G06F 17/18* (2006.01)
*G06K 9/62* (2006.01)
*G06K 9/00* (2006.01)

(52) U.S. Cl.
CPC ....... *G06K 9/6289* (2013.01); *G06K 9/00496* (2013.01); *G06K 2209/27* (2013.01)

(58) Field of Classification Search
CPC .......... G06K 2209/27; G06K 9/00496; G06K 9/6289; G01D 1/16
USPC ......... 702/127, 141, 142, 181, 116; 707/737
See application file for complete search history.

(56) References Cited

U.S. PATENT DOCUMENTS

2012/0310587 A1\* 12/2012 Tu et al. ................ 702/141
2014/0129560 A1\* 5/2014 Grokop ................ G06N 5/043
707/737

\* cited by examiner

*Primary Examiner* — John H Le
(74) *Attorney, Agent, or Firm* — International IP Law Group, P.L.L.C.

(57) ABSTRACT

A method for encapsulating metadata in a contextual data stream is described. The method may include receiving sensor data from a sensor. The method may include receiving metadata associated with the sensor data, wherein the metadata is defined as a probability vector based on a context set associated with the sensor data. The method may also include combining the sensor data and the metadata into a contextual data stream.

22 Claims, 7 Drawing Sheets

TECHNIQUES FOR ENCAPSULATING METADATA IN CONTEXTUAL DATA STREAMS

TECHNICAL FIELD

This disclosure relates generally to methods and systems of receiving contextual data. More specifically, the techniques disclosed relate to receiving contextual data comprised of sensor data and metadata associated with the sensor data.

BACKGROUND ART

Computing devices may include sensors to gather data. The sensors gather data related to the environment of a computing device of which the sensor is a part. In some cases, the sensors and the computing device may be included in a system. The sensors may be configured to gather data. The gathering of sensor data may provide insight into the surrounding conditions of the system.

The same numbers are used throughout the disclosure and the figures to reference like components and features. Numbers in the 101 series refer to features originally found in FIG. 1; numbers in the 200 series refer to features originally found in FIG. 2; and so on.

DESCRIPTION OF THE EMBODIMENTS

The present disclosure relates generally to techniques for receiving sensor data from a sensor and for receiving metadata associated with the sensor data. The sensor may be configured to collect sensor data related to the environment of a computing device, and the computing device may receive a contextual data stream comprised of sensor data and associated metadata. The sensor data is data gathered by the sensors in the system. The sensor data indicates conditions of an environment in which the computing device resides. The metadata is data gathered by a sensor interface. The metadata is data that indicates conditions of the sensors and the sensing context. The metadata may provide additional insight into the sensor data.

The metadata associated with the sensor data may indicate the probability of various conditions in which that the sensor may be operating. Rather than transmitting all of the metadata in the contextual data stream to the computing device, the metadata may be defined as a probability vector rather than a collection of discrete or continuous values, or narrative descriptions of the contextual data stream that represent the operating conditions of the sensor and the sensing context. The probability vector may indicate the probability that the sensor data was received within a specific context as described by the metadata. The specific context is any given operating condition of the sensor.

For example, the sensor may be an ambient light sensor configured to sense ambient light. The sensor data may indicate levels of ambient light, while the metadata may indicate the specific context of the sensor itself. The specific context may include whether the ambient sensor is operating properly and whether the ambient light sensor is properly attached and oriented to the computing device. The probability of each specific context may be combined as the probability vector and then combined with the sensor data to create a contextual data stream and provided to the computing device. As another example, the contextual data may include a vector element indicating whether the sensor data was collected indoors. The vector element is defined as being within a probability range of 0 to 100, with 0 representing zero percent probability the sensor data was collected indoors, and 100 representing 100 percent probability the sensor data was collected indoors. A predetermined value may be set at 85 and any vector element below 85 may be associated with an indication that the sensor data was not collected indoors. In some embodiments, by associating the metadata with a probability vector, the contextual data stream avoids transmitting relatively larger narrative descriptions such as "collected indoors", or "sensor is in room 2".

Figure 1A:
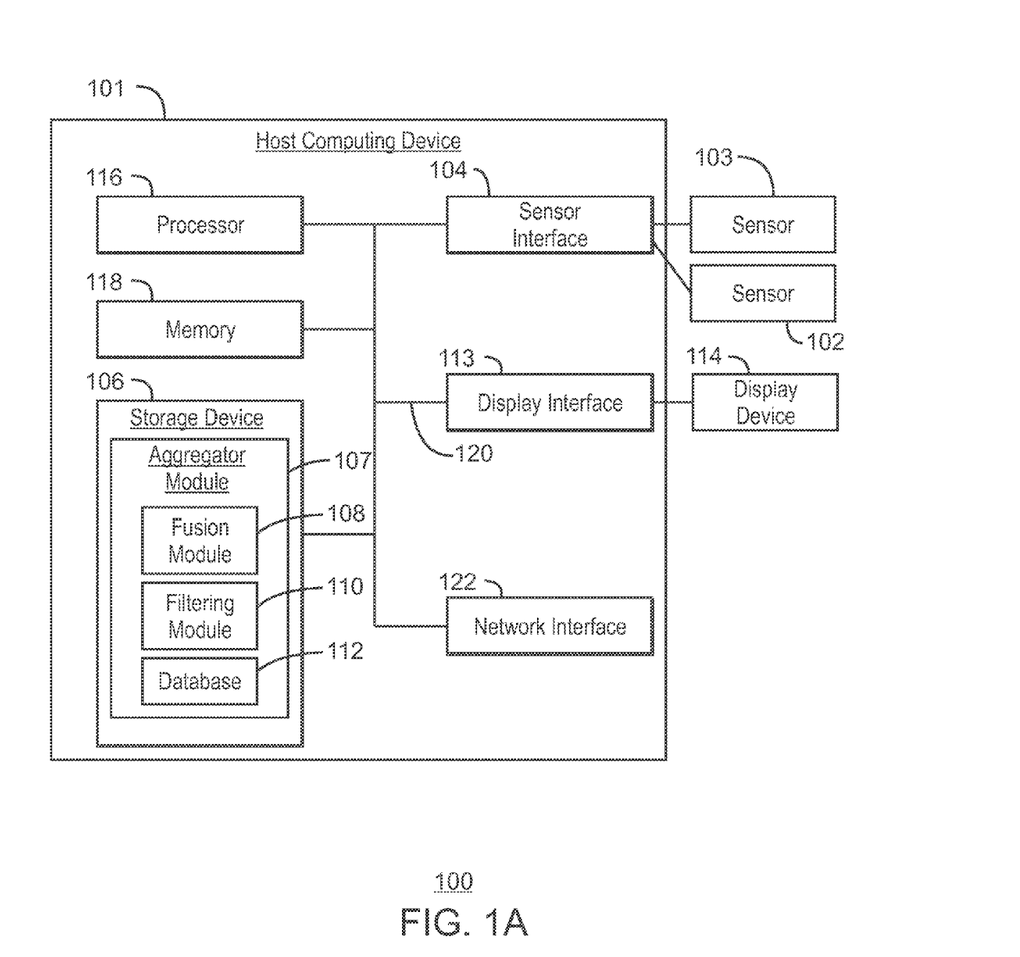
FIG. 1A is a block diagram illustrating a system including a computing device communicatively coupled to a sensor, in accordance with embodiments.

FIG. 1A is a block diagram illustrating a system 100 including a computing device 101 communicatively coupled to a sensor 102, in accordance with embodiments. The computing device 101 includes a sensor interface 104. The sensor interface 104 may be configured to gather sensor data from the sensor 102 and metadata related to the sensor 102. The computing device 101 also includes a processor 116 and a storage device 106.

The computing device 101 may be, for example, a laptop computer, desktop computer, tablet computer, mobile device, server, or cellular phone, a wearable computing device, among others. The processor 116 can be a single core processor, a multi-core processor, a computing cluster, or any number of other configurations. The processor 116 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 116 includes dual-core processor(s), dual-core mobile processor(s), or the like.

The computing device 101 may include a memory device 118. The memory device 118 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 116 may be connected through a system bus 120 (e.g., PCI, ISA, PCI-Express, HyperTransport®, NuBus, etc.) to the sensor interface 104. The processor 116 may also be linked through the system bus 120 to a display interface 113 adapted to connect the computing device 101 to a display device 114. The display device 114 may include a display screen that is a built-in component of the computing device 101. The display device 114 may also include a computer monitor, television, or projector, among others, that is externally connected to the computing device 101.

The storage device 106 may be a non-transitory computer-readable medium. The storage device 106 may have instructions stored thereon that when executed by the processor 116 cause the computing device 101 to perform operations. In some embodiments, the operations may be executed by a controller. In these embodiments, the controller may be a microcontroller configured to carry out the operations related to gathering contextual data and determining a location change of the computing device 101. In other embodiments, the operations may be executed by logic at least partially comprising hardware logic. Hardware logic at least partially includes hardware, and may also include software, or firmware. Hardware logic may include electronic hardware including interconnected electronic components which perform analog or logic operations on received and locally stored information to produce as output or store resulting new information or to provide control for output actuator mechanisms. Electronic hardware may include individual chips/circuits and distributed information processing systems. The operations may include receiving sensor data from the sensor 102. The operations may also include receiving metadata associated with the sensor data, wherein the metadata is defined as a probability vector based on a context set associated with the sensor data, where the context set is any given condition of the sensor. The operations may also include combining the sensor data and the probability vector into a contextual data stream.

For example, the sensor 102 may be a temperature sensor configured to detect the ambient temperature of the environment of the computing device 101. The metadata may indicate that a probability that the sensor is operating properly is 84%. The probability value may be the output of a statistical sensor model, which takes the time since most recent sensor calibration and maximum observed temperature ranges as an input. In this case, the probability vector includes the value of 84. The value of 84 is an example of a vector element. In this example, the vector element 84 indicates the probability that the temperature sensor data is being gathered in a specific context (i.e., via a properly operating sensor). The context set includes the vector element, and may include additional vector elements. The probability vector may be combined with the sensor data into the contextual data stream provided to the processor 116 of the host computing device 101.

As illustrated in FIG. 1, the computing device 101 may be coupled to a plurality of sensors 102, 103. In some embodiments, the sensor 102 may be a first sensor, and the sensor data stream may be a first sensor data stream. The computing device 101 may include a second sensor 103. The processor 116 may be further configured to carry out operations including receiving a second sensor data from the second sensor 103. The processor 116 may also be configured to receive a second metadata associated with the second sensor data. The processor 116 may combine the second sensor data from the second sensor 103 and the second probability vector associated with the second sensor 103 into a second contextual data stream.

The contextual data gathered from multiple sensors may be analyzed at an aggregator module 107. The aggregator module 107 may include additional modules including a fusion module 108 and a filtering module 110. Each of the modules 107, 108, and 110 may include a set of operations that may be carried out by the processor 116. The fusion module 108 operates to aggregate and average contextual data streams. For example, the fusion module 108 may average the first contextual data stream and the second contextual data stream to determine an average contextual data stream. The filtering module 110 operates to filter the contextual data stream based on a value of the probability vector. The aggregator module 107 may also include a database 112. The database 112 may be referenced by the filtering module 110. Based on the value of the probability vector and a predetermined value associated with a specific context, the filtering module 110 may filter data of the contextual data streams. The predetermined value may be values associated known probabilities associated with a specific context. For example, the predetermined value may be a specific operational condition defined by a manufacturer of the first or second sensor 102, 103. As another example, the predetermined value may be a historical value related to whether the host platform is stationary based on historical contextual data gathered indicating a stationary platform. The filtering of metadata is described in more detail below in reference to FIG. 4A.

In some embodiments, first and second sensors 102, 103 may be remote from the computing device 101. In these embodiments, the computing device 101 may include a network interface card 122. The network interface card 122 may be configured to receive sensor data transmitted by the first and second sensors 102, 103 over a network.

Figure 1B:
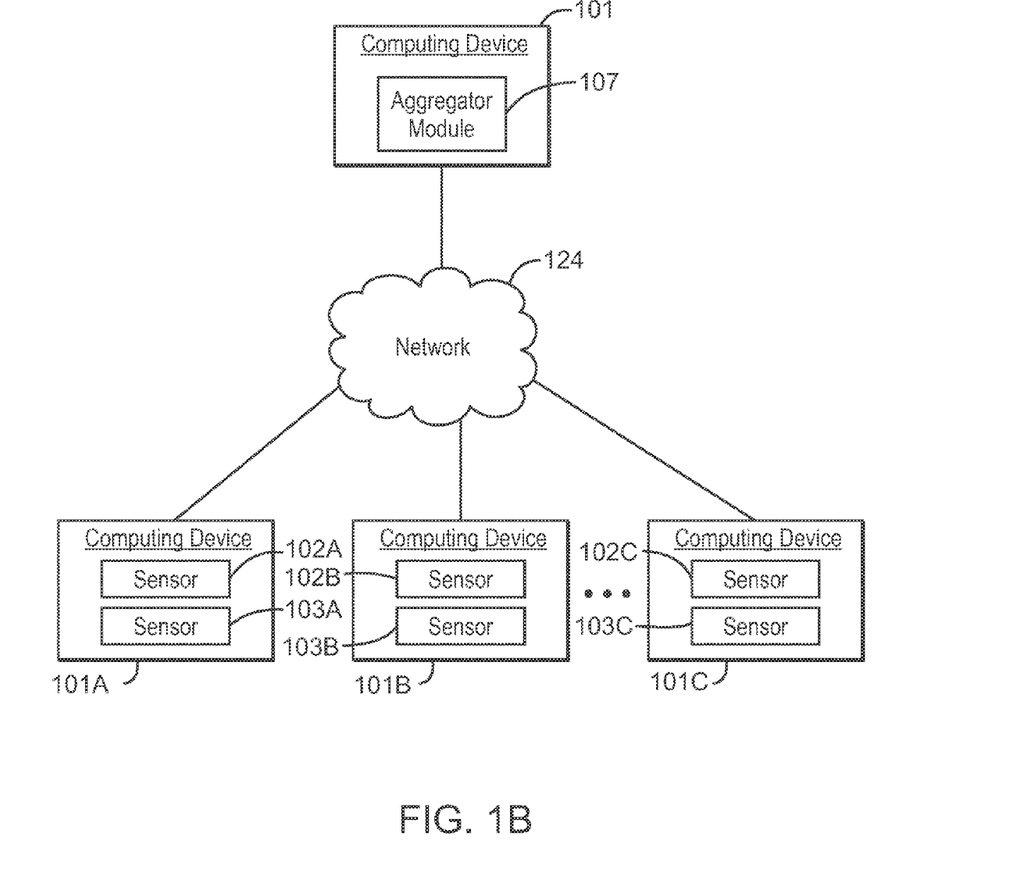
FIG. 1B is a block diagram illustrating the computing device receiving sensor data over a network.

FIG. 1B is a block diagram illustrating the computing device 101 receiving sensor data over a network 124. The computing device 101 may be connected to the network 124. The network may communicatively couple the computing device 101 with other computing devices 101A, 101B, 101C. In this embodiment, the other computing devices 101A, 101B, 101C may collect sensor data from a first sensor 102A, 102B, 102C and a second sensor 103A, 103B, 103C located on each of the computing devices 101A, 101B, 101C, respectively. The computing device 101 may receive the sensor data and metadata in a contextual data stream over the network 124 and may perform operations at the aggregator module. In this embodiment, the computing device 101 performs the operations, while the other computing devices 101A, 101B, 101C provide a platform to gather a sensor data and metadata as well as provide the contextual data stream to the network 124. In some embodiments, the aggregator module 107 may be located on a server (not shown) connected to the network 124. In this embodiment, the computing device 101 may receive analyzed contextual data from the server, and the computing devices 101A, 101B, 101C may be provide contextual data streams to the server.

Figure 2:
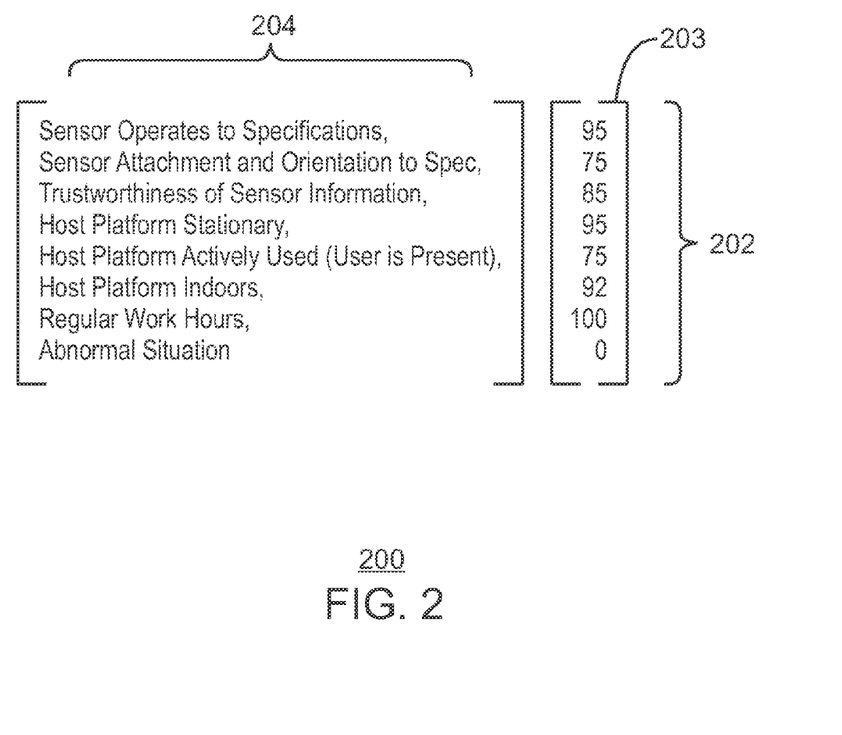
FIG. 2 is a table illustrating vector elements of a probability vector, in accordance with embodiments.

FIG. 2 is a table 200 illustrating vector elements 202 of a probability vector 203. A "probability vector," as used herein, is a vector wherein each element of the vector represents the likelihood that the particular context represented by the element occurred during sensing of the associated sensor data. For example, the probability vector 203 includes vector elements 202, and each of the vector elements 202 is a value. Each of the values of the vector elements 202 is associated with a probability that the sensor data was received within the respective context listed in the context set 204.

In some embodiments, the context set is developed by determining an analysis that may be performed on the sensor data and identifying the context set based on the determined analysis. In some embodiments, the context set 204 may include one or more subsets. In some embodiments, the context set 204 may include a first sub-set associated sensor data other than the sensor data gathered by the sensor. For example, the sub-set may indicate the context set 204 may include whether the contextual data is received during business hours as indicated by a clock or a time sensor. In some embodiments, the context set 204 may include a second sub-set associated with conditions of an interface between the sensor and the device. For example, the sub-set may indicate whether the sensor's physical attachment and orientation are according to specifications. In some embodiments, the context set 204 may include a third sub-set associated with the conditions of the device to which the sensor is attached. For example, the sub-set may indicate whether the device is actively being used. In some embodiments, the context set 204 may include a forth subset associated with the operational conditions of the sensor. For example, the sub-set may indicate whether the sensor is operating according to specifications associated with the sensor. In some embodiments, the context set 204 may include a fifth subset related to the trustworthiness of the sensor data. For example, the sub-set may indicate whether the sensor data provided by the sensor is trustworthy based on security protocols of the computing device. One skilled in the art may readily recognize that additional subsets are contemplated and any specific context is not limited to the examples of subsets provided.

Figure 3:
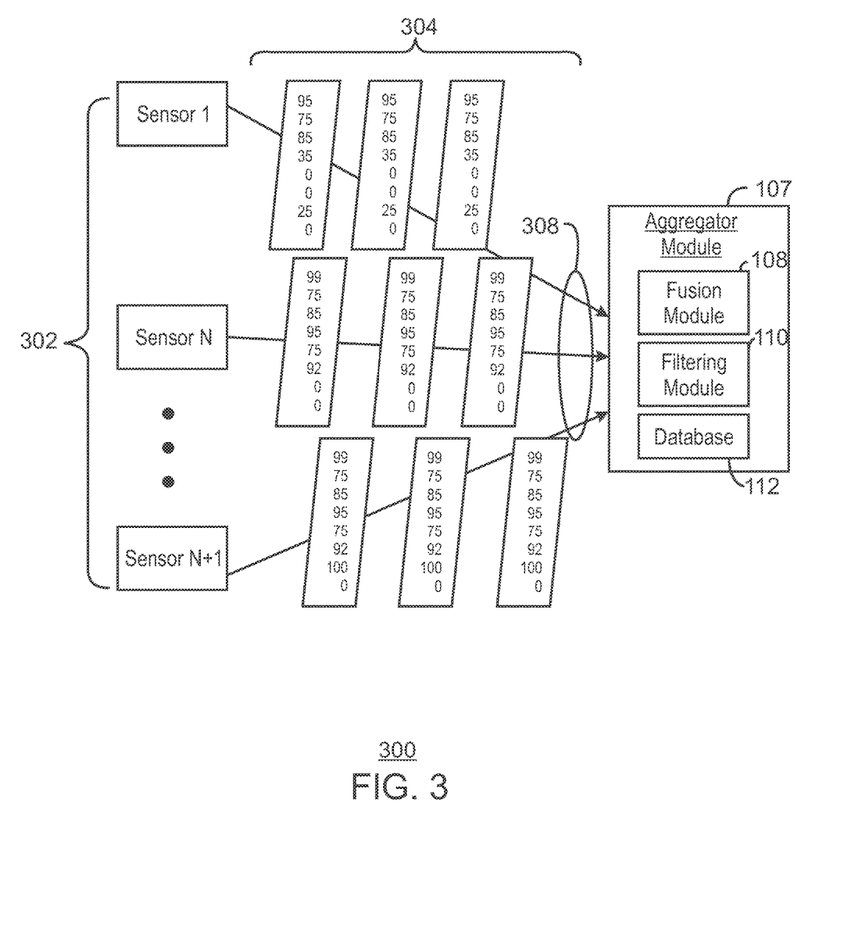
FIG. 3 is a block diagram illustrating sensors configured to provide probability vectors to an aggregator module in a contextual data stream, in accordance with embodiments.

FIG. 3 is a block diagram illustrating sensors 302 configured to provide probability vectors 304 to the aggregator module 107 in contextual data streams 308, in accordance with embodiments. As illustrated in FIG. 3, any number of sensors may be used, as shown by including sensor 1, sensor N, and sensor N+1. In some embodiments, the sensors 302 may be communicating with the aggregator module 107 via a network, such as the network 124 in FIG. 1B. The aggregator module 107 may be configured to perform operations on the contextual data streams 308 received from the sensors 302. In some embodiments, the aggregator module 107 may be a set of instructions stored on the storage device 106 of FIG. 1, and the instructions may cause the computing device 101 to perform operations to analyze the contextual data streams 308. The aggregator module 107 may perform operations as discussed with respect to FIG. 1.

Figure 4A:
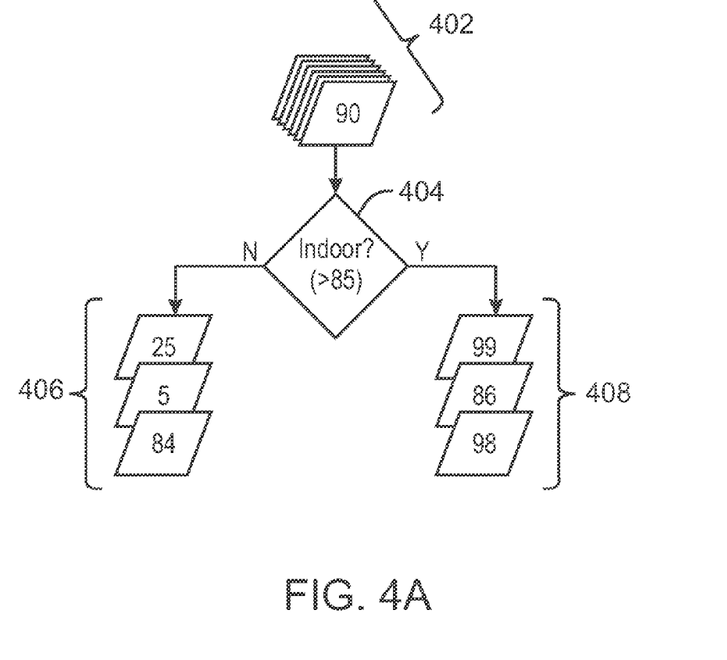
FIG. 4A illustrates one element of a probability vector in the contextual data stream, in accordance with embodiments.

FIG. 4A illustrates one element of a probability vector in the contextual data stream 402, in accordance with embodiments. The probability vector element may be set to a value, such as the value 90 illustrated in the first data item of data stream 402. The value 90 indicates the probability that the sensor data associated with the contextual data item was gathered within a specific context. For example, the specific context may be whether the sensor data was gathered indoors or outdoors as indicated at block 404. The value of 90 illustrated at block 402 may indicate a 90 percent chance that the associated sensor data was gathered indoors. The vector element at block 402 may be the average of various vector elements, such as an average of the list of vector elements 202 in FIG. 2. The filtering module 107 of FIG. 1 and FIG. 3 may be configured to compare the probability vector at block 402 to the predefined value at block 404.

In some embodiments, the predefined value at block 404 is based on the historical average of vector elements indicating whether sensor data was gathered indoors or outdoors. For example, historical values may be stored in the database 112 discussed above in reference to FIGS. 1 and 3. In some embodiments, the predefined value at block 404 is based on user input. In either embodiment, if the vector element at block 402 is below the predefined value, it may be determined that the sensor data was gathered outdoors. If the vector element is below the predefined value, the contextual data item may then be added to a stream associated with sensor data that was gathered outdoors at block 406. Alternatively, if the element vector is above the predefined value at block 404, it may be determined that the sensor data was gathered indoors, and the contextual data item may be added to a stream associated with sensor data that was gathered indoors at block 408.

Figure 4B:
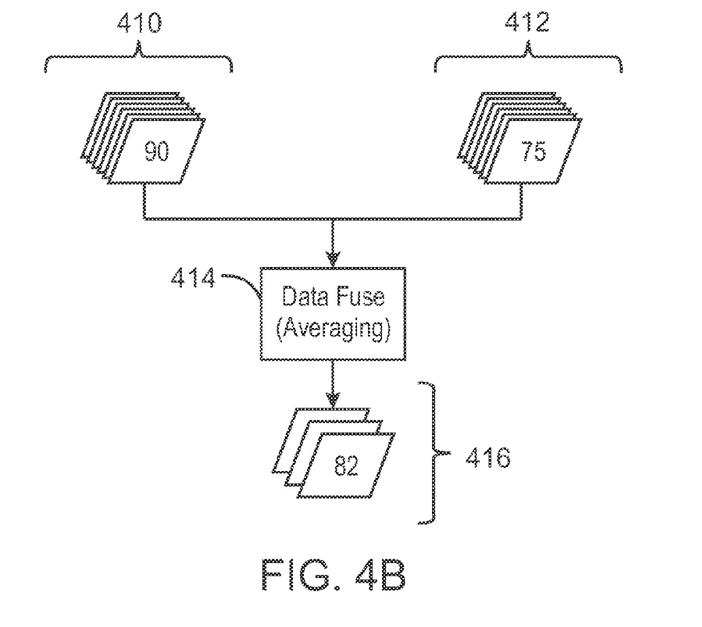
FIG. 4B illustrates multiple probability vectors containing one element associated with multiple sensors, in accordance with embodiments.

FIG. 4B illustrates multiple probability vectors containing one element at block 410 and block 412, respectively, associated with multiple sensors, in accordance with embodiments. The values associated with the probability vector at block 410 may be averaged at block 414 with the probability vector at block 412. In other words, multiple probability vectors may be a fused, or averaged, at block 416. The fused probability vector at block 416 may be compared with predetermined values at block 404 discussed above in reference to FIG. 4A. In some embodiments, the process flow diagram illustrated in FIG. 4B is carried out by a fusion module, such as the fusion module 108 discussed in reference to FIG. 1 and FIG. 3.

Figure 5:
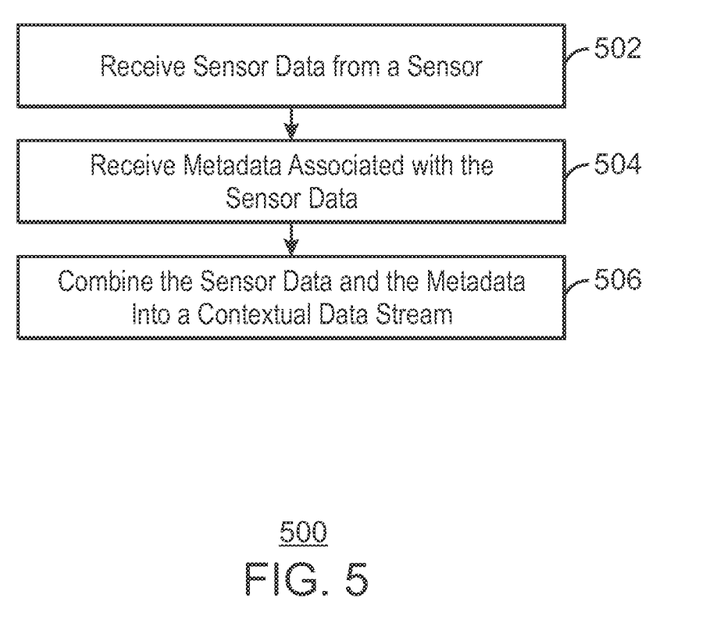
FIG. 5 is a block diagram of a method for receiving sensor data and metadata associated with the contextual data, in accordance with embodiments.

FIG. 5 is a process flow diagram of a method 500 for receiving sensor data and metadata associated with the sensor data, in accordance with embodiments. The method 500 may include, at block 502, receiving sensor data from a sensor. The method 500 may include, at block 504, receiving metadata associated with the sensor data 504. The metadata may be defined as a probability vector based on a context set associated with the sensor data. The method may include, at block 506, combining the sensor data and the metadata into a contextual data stream.

The metadata, received at block 504, may be defined as a probability vector based on a context set associated with the sensor data. The probability vector may associate the metadata with a number of vector elements which may represent the probability that the sensor is operating within a specific context. In some embodiments, additional sensor data and metadata may be gathered from additional sensors. In this embodiment, the contextual data received at block 502 may be first sensor data from a first sensor. The metadata received at block 504 may be first metadata associated with the first sensor data. The method 500 may also include receiving second sensor data associated with a second sensor and second metadata associated with the second sensor data. The method 500 may also combine the second sensor data and the second probability vector into a second contextual data stream. The method 500 may average the first contextual data stream and the second contextual data stream to determine an average contextual data stream.

As discussed above with reference to FIG. 2, the probability vector includes vector elements each of which may be associated with a probability that the sensor data was received within a specific context. The specific context may include various types of contexts indicated in FIG. 2 above. In some embodiments, the method 500 may include determining an analysis that may be performed on the sensor data. In some embodiments, the method 500 may also include identifying the context set based on the determined analysis. For example, the context set may be identified based on analysis that may be performed on any sensor data received. Therefore, the context set may be determined based on a type of analysis that may be performed on the sensor data. In other embodiments, the method 500 may include identifying the context set based on a cost of gathering metadata associated with the context set identified.

For example, the context set may be determined based on the cost (such as monetary, time, and the like) of collecting the metadata associated with any given context set, and based on the benefit that may be gained by collecting the context set.

In some embodiments, a vector element may be gathered by a sensor interface, such as the sensor interface 104 illustrated in FIG. 1. In some embodiments, the method 500 may include filtering the contextual data stream by comparing a value of the probability vector with a predetermined value. In some embodiments, the method 500 may include storing the contextual data stream on a non-transitory computer-readable medium.

Figure 6:
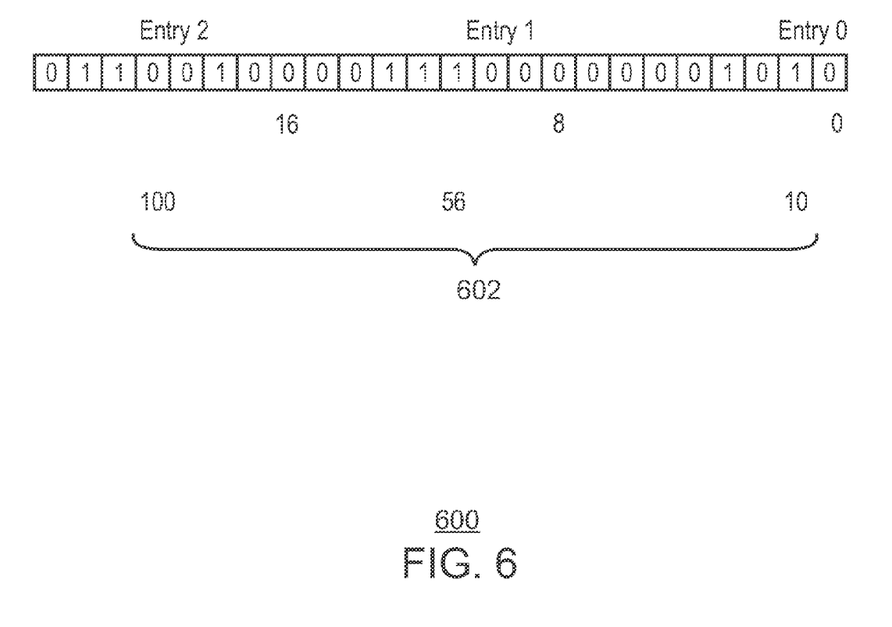
FIG. 6 illustrates storing the vector elements of the probability vector in compact manner.

FIG. 6 illustrates storing the vector elements of the probability vector in compact manner. The probability vector combined with the sensor data stream may be compacted. The method 500 may include compacting the probability vector by storing the probability vector in a 64 bit integer manner. Storing the probability vector in a 64 bit integer manner may be appropriate for a probability vector with eight vector elements. As illustrated in FIG. 6, three vector elements 602 are stored in a 24 bit integer manner.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

In the preceding description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computer-implemented method comprising a controller to carry out operations, the operations executed by an electronic hardware including interconnected electronic components which perform analog or logic operations, comprising:
   receiving sensor data from a sensor at a computing device via a network;
   receiving metadata associated with the sensor data at the computing device via the network, wherein the metadata is defined as a probability vector based on a context set associated with the sensor data;
   combining the sensor data and the probability vector into a contextual data stream comprising vector elements; and
   transmitting vector elements of the contextual data stream to a processor of the computing device to indicate proper operation of the sensor and conditions of an environment in which the computing device resides without a collection of discrete values, continuous values, or narrative descriptions of the contextual data stream.

2. The method of claim 1, wherein the sensor is a first sensor and the contextual data stream is a first contextual data stream, further comprising:
   receiving second sensor data from a second sensor;
   receiving second metadata associated with the second sensor data received from the second sensor, wherein the second metadata is defined as a second probability vector based on a context set associated with the second sensor data;

combining the second sensor data and the second probability vector into a second contextual data stream; and averaging the first contextual data stream with the second contextual data stream to determine an average contextual data stream.

3. The method of claim 1, wherein the probability vector comprises one or more vector elements, wherein each of the one or more vector elements is associated with a probability that the sensor data was received within a specific context.

4. The method of claim 3, wherein each vector element is gathered by a sensor interface configured to receive the metadata as the sensor data is gathered.

5. The method of claim 1, wherein the context set comprises at least one or more of:
 a first sub-set associated sensor data other than the sensor data gathered by the sensor;
 a second sub-set associated with conditions of an interface between the sensor and the device;
 a third sub-set associated with the conditions of the device to which the sensor is attached; or
 a forth subset associated with the operational conditions of the sensor.

6. The method of claim 1, comprising:
 determining an analysis that may be performed on the sensor data and identifying the context set based on the determined analysis; or
 identifying the context set based on a cost of gathering metadata associated with the context set identified.

7. The method of claim 1, further comprising filtering the contextual data stream by comparing a value of the probability vector with a predetermined value.

8. The method of claim 1, further comprising storing the contextual data stream on a non-transitory computer-readable medium.

9. A computing device, comprising a controller to carry out operations, the operations executed by an electronic hardware including interconnected electronic components which perform analog or logic operations comprising:
 receiving sensor data from the sensor at a computing device via a network;
 receiving metadata associated with the sensor data at the computing device via the network, wherein the metadata is defined as a probability vector based on a context set associated with the sensor data;
 combining the sensor data and the probability vector into a contextual data stream comprising vector elements; and
 transmitting vector elements of the contextual data stream to a processor of the computing device to indicate proper operation of the sensor and conditions of an environment in which the computing device resides without a collection of discrete values, continuous values, or narrative descriptions of the contextual data stream.

10. The computing device of claim 9, comprising a coupling to a sensor wherein the sensor is a first sensor and the contextual data stream is a first contextual data stream, the operations further comprising:
 receiving second sensor data from a second sensor;
 receiving second metadata associated with the second sensor data received from the second sensor, wherein the second metadata is defined as a second probability vector based on a context set associated with the second sensor data;
 combining the second sensor data and the second probability vector into a second contextual data stream; and
 averaging the first contextual data stream with the second contextual data stream to determine an average contextual data stream.

11. The computing device of claim 9, wherein the probability vector comprises one or more vector elements, wherein each of the one or more vector elements is associated with a probability that the sensor data was received within a specific context.

12. The computing device of claim 9, wherein the context set comprises at least one or more of:
 a first sub-set associated with sensor data other than the sensor data gathered by a sensor;
 a second sub-set associated with conditions of an interface between the sensor and the device;
 a third sub-set associated with the conditions of the device to which the sensor is attached; or
 a forth subset associated with the operational conditions of the sensor.

13. The computing device of claim 9, comprising a fusion module that is configured to aggregate and average a plurality of contextual data streams.

14. The computing device of claim 9, comprising a filtering module that is configured to filter the contextual data stream based on a value of the probability vector.

15. The computing device of claim 9, wherein a sensor is located in a remote location from the computing device.

16. A system, comprising:
 a computing device;
 a sensor;
 a controller to carry out operations, the operations executed by an electronic hardware including interconnected electronic components which perform analog or logic operations to:
  receive sensor data from the sensor at the computing device via a network; and
  receive metadata associated with the sensor data at the computing via the network, wherein the metadata is defined as a probability vector based on a context set associated with the sensor data;
  combine the sensor data and the probability vector into a contextual data stream comprising vector elements; and
  transmit vector elements of the contextual data stream to a processor of the computing device to indicate proper operation of the sensor and conditions of an environment in which the computing device resides without a collection of discrete values, continuous values, or narrative descriptions of the contextual data stream.

17. The system of claim 16, wherein the sensor is a first sensor and the contextual data stream is a first contextual data stream, further comprising:
 receiving second sensor data from a second sensor;
 receiving second metadata associated with the second sensor data received from the second sensor, wherein the second metadata is defined as a second probability vector based on a context set associated with the sensor data;
 combining the second sensor data and the second probability vector into a second contextual data stream; and
 averaging the first contextual data stream with the second contextual data stream to determine an average contextual data stream.

18. The system of claim 16, wherein the probability vector comprises vector elements, wherein each of the vector elements is associated with a probability that the sensor data was received within a specific context.

19. The system of claim 16, wherein the context set comprises at least one or more of:
   a first sub-set associated with sensor data other than the sensor data gathered by the sensor;
   a second sub-set associated with conditions of an interface between the sensor and the device;
   a third sub-set associated with the conditions of the device to which the sensor is attached; or
   a forth subset associated with the operational conditions of the sensor.

20. The system of claim 16, comprising a fusion module that is configured to aggregate and average contextual data streams.

21. The system of claim 16, comprising a filtering module that is configured to filter the contextual data stream based on a value of the probability vector.

22. The system of claim 16, wherein the sensor is located remote from the computing device.

* * * * *